United States Patent
Nakajima

(10) Patent No.: US 8,874,096 B2
(45) Date of Patent: Oct. 28, 2014

(54) COMMUNICATION TERMINAL AND APPLICATION CONTROL METHOD

(75) Inventor: Ryo Nakajima, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 44 days.

(21) Appl. No.: 13/641,324

(22) PCT Filed: Apr. 4, 2011

(86) PCT No.: PCT/JP2011/058551
§ 371 (c)(1),
(2), (4) Date: Nov. 2, 2012

(87) PCT Pub. No.: WO2011/132522
PCT Pub. Date: Oct. 27, 2011

(65) Prior Publication Data
US 2013/0053015 A1     Feb. 28, 2013

(30) Foreign Application Priority Data
Apr. 23, 2010   (JO) .............................. P2010-100184

(51) Int. Cl.
| H04M 3/00 | (2006.01) |
| H04L 29/06 | (2006.01) |
| H04M 1/725 | (2006.01) |
| G06F 9/48 | (2006.01) |
| H04L 29/08 | (2006.01) |

(52) U.S. Cl.
CPC ........... G06F 9/485 (2013.01); H04M 1/72522 (2013.01); H04L 67/145 (2013.01); G06F 2209/482 (2013.01)
USPC ....................................... 455/418; 455/414.3

(58) Field of Classification Search
USPC ............. 455/418, 412.1, 412.2, 414.1, 414.2, 455/414.3, 572, 574
See application file for complete search history.

(56) References Cited

U.S. PATENT DOCUMENTS

| 7,899,037 B1* | 3/2011 | Paczkowski et al. .......... 370/352 |
| 2003/0125023 A1* | 7/2003 | Fishler ........................... 455/426 |
| 2004/0209615 A1* | 10/2004 | Lamb et al. .................... 455/433 |
| 2004/0214555 A1* | 10/2004 | Kumar et al. ............... 455/414.1 |

FOREIGN PATENT DOCUMENTS

JP         11-250010 A       9/1999

OTHER PUBLICATIONS

International Search Report issued Jul. 5, 2011, in PCT/JP2011/058551.
International Preliminary Report on Patentability issued Nov. 15, 2012, in PCT/JP2011/058551.

(Continued)

Primary Examiner — Christopher M Brandt
(74) Attorney, Agent, or Firm — Oblon, Spivak, McClelland, Maier & Neustadt, L.L.P.

(57) ABSTRACT

A communication terminal includes: an application control unit that controls execution of an application; a communication control unit that controls a communication unit to establish communication with a communication network, and a suspension control unit that, after detecting a terminal operation that becomes a factor in suspending the application, transmits a suspend command to suspend the application that is running to the application control unit. The suspension control unit is, in response to the terminal operation thus detected, capable of selecting a keep-alive state for transmitting the suspend command to the application control unit without disconnecting communication connection with the communication network by the communication unit. The communication terminal prevents unnecessary disconnection of communication by a suspend operation and improving convenience and comfortableness of application operation.

7 Claims, 7 Drawing Sheets

| SUSPENSION FACTOR | WHETHER TO SELECT KEEP-ALIVE STATE |
|---|---|
| RECEPTION OF VOICE CALL | KEEP ALIVE |
| CALL OF METHOD (CAMERA, DVT, ETC.) | KEEP ALIVE |
| TRANSMISSION USING HEADSET WITH MICROPHONE | KEEP ALIVE |
| HANDS-FREE COMMUNICATION | KEEP ALIVE |
| LOW VOLTAGE ALARM | DISCONNECT (EVEN IF APPLICATION IS SUSPENDED, REMAINING VOLTAGE IS LOW) |
| RECEPTION OF VIDEO CALL | DISCONNECT (DISCONNECT BY ANSWERING CALL) |

(56) References Cited

OTHER PUBLICATIONS

Written Opinion of the International Searching Authority issued Jul. 5, 2011, in PCT/JP2011/058551.
Office Action issued Jul. 3, 2012, in Japanese Patent Application No. 2010-100184.

"3$^{rd}$ Generation Partnership Project; Technical Specification Group Services and System Aspects; General Packet Radio Service (GPRS); Service description, Stage 1 (Release 9)", 3GPP TS 22.060 V9.0.0 (Dec. 2009), pp. 17-18.
Seiji Hagiwara, et al., "IMT/GSM Dual Mobile Terminal N900iG Supporting International Roaming", Development Reports, vol. 13, No. 1, Apr. 1, 2005, pp. 40-47 with English translation.

* cited by examiner

*Fig.3*

| SUSPENSION FACTOR | WHETHER TO SELECT KEEP-ALIVE STATE |
|---|---|
| RECEPTION OF VOICE CALL | KEEP ALIVE |
| CALL OF METHOD (CAMERA, DVT, ETC.) | KEEP ALIVE |
| TRANSMISSION USING HEADSET WITH MICROPHONE | KEEP ALIVE |
| HANDS-FREE COMMUNICATION | KEEP ALIVE |
| LOW VOLTAGE ALARM | DISCONNECT (EVEN IF APPLICATION IS SUSPENDED, REMAINING VOLTAGE IS LOW) |
| RECEPTION OF VIDEO CALL | DISCONNECT (DISCONNECT BY ANSWERING CALL) |

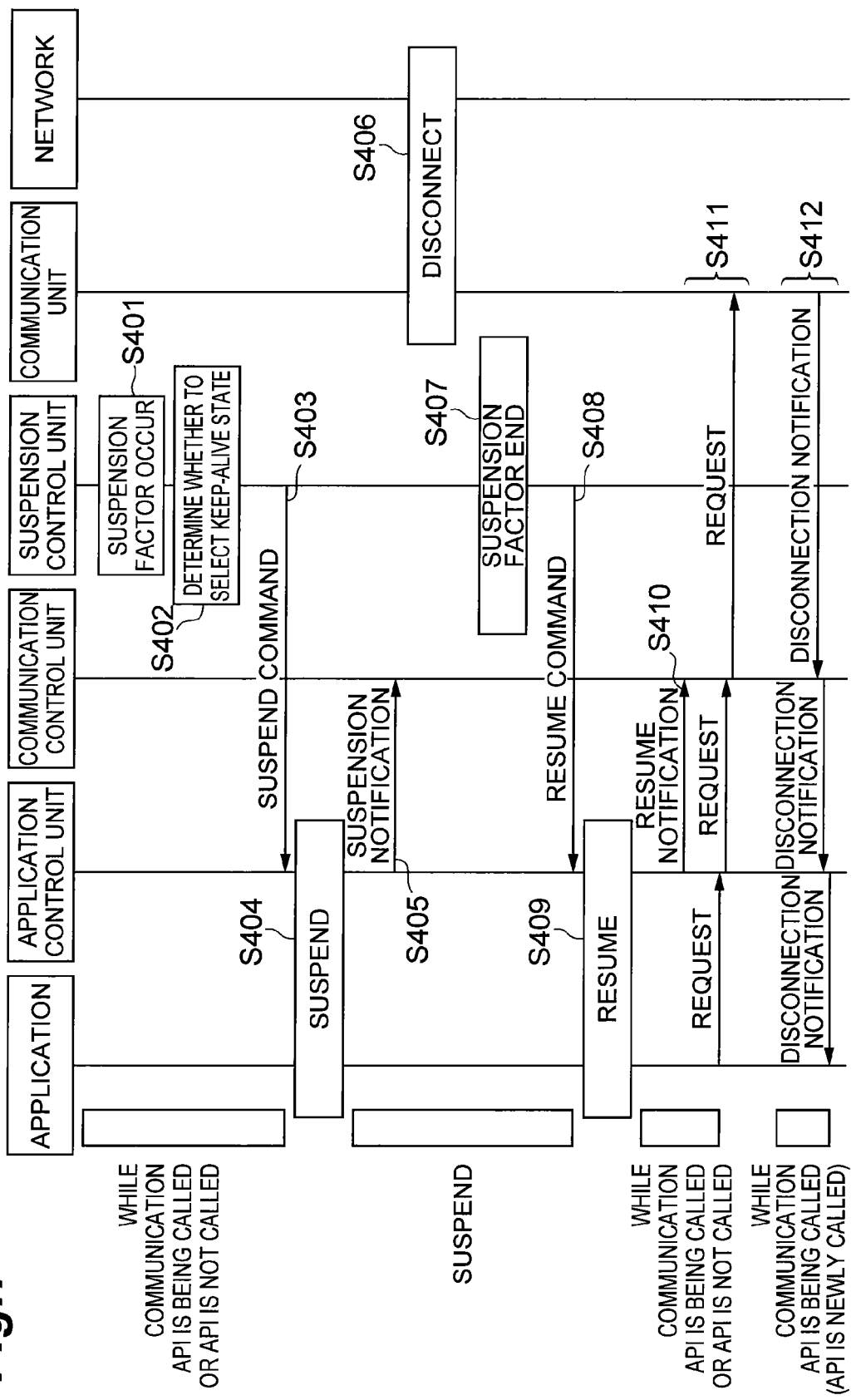

COMMUNICATION TERMINAL AND APPLICATION CONTROL METHOD

TECHNICAL FIELD

The present invention relates to a communication terminal and an application control method executed in the communication terminal.

BACKGROUND ART

In recent years, for communication terminals such as cellular phones or PDAs, many applications such as online games each of which has a communication function and is used while being communicatively connected to a network such as a mobile communication network have been provided. Such applications, while connected to a network, when requested a transition to a suspended state from a terminal to give priority to operation such as reception of a voice call or key operation by a user, are put in a suspended state after communication with the network is disconnected (see Patent Literature 1, for example).

CITATION LIST

Patent Literature

Patent Literature 1: Japanese Patent Application Laid-Open Publication No. 11-250010

SUMMARY OF INVENTION

Technical Problem

However, a technique described in Patent Literature 1 in which an application is caused to transit to a suspended state after all network connections are disconnected has the following problems. For example, while conducting online communication (such as a game), when the application is suspended by an erroneous depression of an on-hook key or a voice phone conversation for a short period of time, a TCP session or UDP communication, for example, is disconnected and accordingly, even though the communication is originally desired to be maintained, the communication will be disconnected.

In this manner, when unintended and unnecessary disconnection of communication is performed by a suspend operation, a reconnection operation is required to restart the communication. Because it takes time for a process of this reconnection operation, there is a possibility that convenience and comfortableness of a user of a communication terminal using the application are lost.

The present invention has been made to solve the above-mentioned problems, and aims to provide a communication terminal and an application control method making it possible to prevent unnecessary disconnection of communication due to a suspend operation and to improve convenience and comfortableness of an application operation.

Solution to Problem

To solve the above-mentioned problems, a communication terminal according to the present invention includes application control means for controlling execution of an application; communication control means for, after an application including a communication function is executed by the application control means, controlling communication means to establish communication with a communication network and executing the communication function of the application; and suspension control means for, after detecting a terminal operation that becomes a factor in suspending the application, transmitting a suspend command to suspend the application that is running to the application control means, wherein the suspension control means is, in response to the terminal operation, capable of selecting a keep-alive state for transmitting the suspend command to suspend the application including the communication function to the application control means without disconnecting communication connection with the communication network by the communication means.

Similarly, to solve the above-mentioned problems, an application control method according to the present invention is a method executed in a communication terminal that includes application control means for controlling execution of an application; communication control means for, after an application including a communication function is executed by the application control means, controlling communication means to establish communication with a communication network and executing the communication function of the application; and suspension control means for, after detecting a terminal operation that becomes a factor in suspending the application, transmitting a suspend command to suspend the application that is running to the application control means, the application control method including a detecting step of, by the suspension control means, detecting the terminal operation; a transmitting step of, by the suspension control means, when the terminal operation is detected at the detecting step, transmitting the suspend command to suspend the application including the communication function to the application control means; and a selecting step of, by the suspension control means, in response to the terminal operation detected at the detecting step, selecting a keep-alive state for maintaining a communication connection state without disconnecting communication connection with the communication network by the communication means.

With the communication terminal and the application control method, in response to the operation that becomes a factor in suspending the application, the keep-alive state for maintaining the communication connection with the communication network by the communication means without disconnecting it can be selected. Accordingly, while conducting online communication by the application, even when the application is suspended by an erroneous depression of an on-hook key or a voice phone conversation for a short period of time, unintended and unnecessary disconnection of communication can be prevented from being performed and, when recovering the application from the suspension, a time-consuming reconnection operation becomes unnecessary, and therefore convenience and comfortableness of a user can be improved. In addition, because communication with the communication network by the communication means is maintained even if the application is suspended, the communication seems to continue without any changes from a counterpart device that was communicating with the communication terminal via the communication network at the time of suspension, and smooth continuity of the communication with the counterpart device becomes possible.

In addition, in the communication terminal according to the present invention, it is preferable that the suspension control means, after detecting an end of the terminal operation that becomes a factor in suspending the application, transmit a resume command to resume the application in a suspended state to the application control means, and the application control means resume, in response to reception of the resume command, the application suspended in response to the suspend command.

In addition, it is preferable that the application control means, after resuming the application in response to the reception of the resume command, transmit a resume notification indicative of having resumed the application to the communication control means, and the communication control means, with the communication function of the application being executed when the application is suspended, when receiving data on the communication function of the application from the communication network via the communication means while the application is being suspended, retain the data thus received and, in response to reception of the resume notification from the application control means, transmit the data retained to the application control means, and the application control means transmit the data received from the communication control means to the communication function of the application.

With this configuration, because data transmitted to the application in a suspended state from an external communication network can be received and retained, it becomes possible to acquire all data without exception even in a suspended state, which can further improve convenience and comfortableness of the user. In addition, because data transmission to the application in a suspended state becomes possible, from the counterpart device that is communicating with the communication terminal via the communication network, the communication seems continuous without any changes, and smooth continuity of communication with the counterpart device becomes possible.

In addition, when a state of the communication terminal transitions to out of service while the application is being suspended, it is preferred that a preservation state be selected for maintaining communication connected with the communication network by the communication means.

With this configuration, even when a state of the communication terminal transitions to out of service, the preservation state can be selected for maintaining the connected state of communication with the communication network by the communication means, and accordingly disconnection of communication can be avoided even in transition to out of service for a short period of time such as passing through a tunnel, which can further improve convenience and comfortableness of the user.

In addition, it is preferable that the communication control means, with the communication function of the application being executed when the application is suspended, when the communication with the communication network by the communication means is disconnected while the application is being suspended, retain a disconnection notification indicating that the communication has been disconnected and, when the application suspended is resumed, transmit the disconnection notification to the communication function of the application via the application control means.

With this configuration, when resuming the application that is suspended while the communication function is being executed, it becomes possible to immediately notify the user of the communication terminal that the communication with the communication network was disconnected, which can further improve convenience and comfortableness of the user.

In addition, it is preferable that the communication control means, when receiving data on the communication function of the application from the communication network via the communication means before the communication with the communication network by the communication means is disconnected while the application is being suspended, retain data thus received without retaining the disconnection notification and, when resuming the application suspended, transmit the data to the application via the application control means.

With this configuration, before the communication with the external communication network is disconnected, the data transmitted from the communication network to the application in a suspended state can be received and retained, and thus it becomes possible to acquire the data thus received even in a suspended state, which can further improve convenience and comfortableness of the user.

In addition, it is preferable that in a case that the communication function of the application is not executed when the application is suspended and the communication with the communication network by the communication means is disconnected while the application is being suspended, the communication means retain information indicating that the communication has been disconnected and, when the communication function is executed after the application suspended is resumed, the communication means transmit the disconnection notification indicating that the communication has been disconnected to the communication function of the application via the communication control means and the application control means.

With this configuration, even if the communication with the communication network is disconnected during the suspended state, when the communication function of the application is used for the first time after resume, it is possible to notify the user of the communication terminal that the communication with the communication network has been disconnected, and thus the user is not notified of unnecessary information when the application is resumed, which can further improve convenience and comfortableness of the user.

Advantageous Effects of Invention

With a communication terminal and an application control method according to the present invention, it is possible to prevent unnecessary disconnection of communication by a suspend operation and to improve convenience and comfortableness of application operation.

BRIEF DESCRIPTION OF DRAWINGS

FIG. 3 is a table illustrating one n example of terminal operations that become factors of suspension and definition of whether to select a keep-alive state or not for each of these operations.

FIG. 7 is a sequence diagram illustrating processes when the application is suspended while a communication API is not being called and further communication connection with the network is disconnected during a keep-alive state in the series of processes from suspension to resumption of the application that are performed in the communication terminal 100 of the present embodiment.

DESCRIPTION OF EMBODIMENTS

Embodiments of the present invention will be described in detail hereinafter with reference to the attached drawings. Note that like reference signs are given to like or equivalent elements in descriptions of the drawings, and redundant explanations are omitted.

Figure 1:
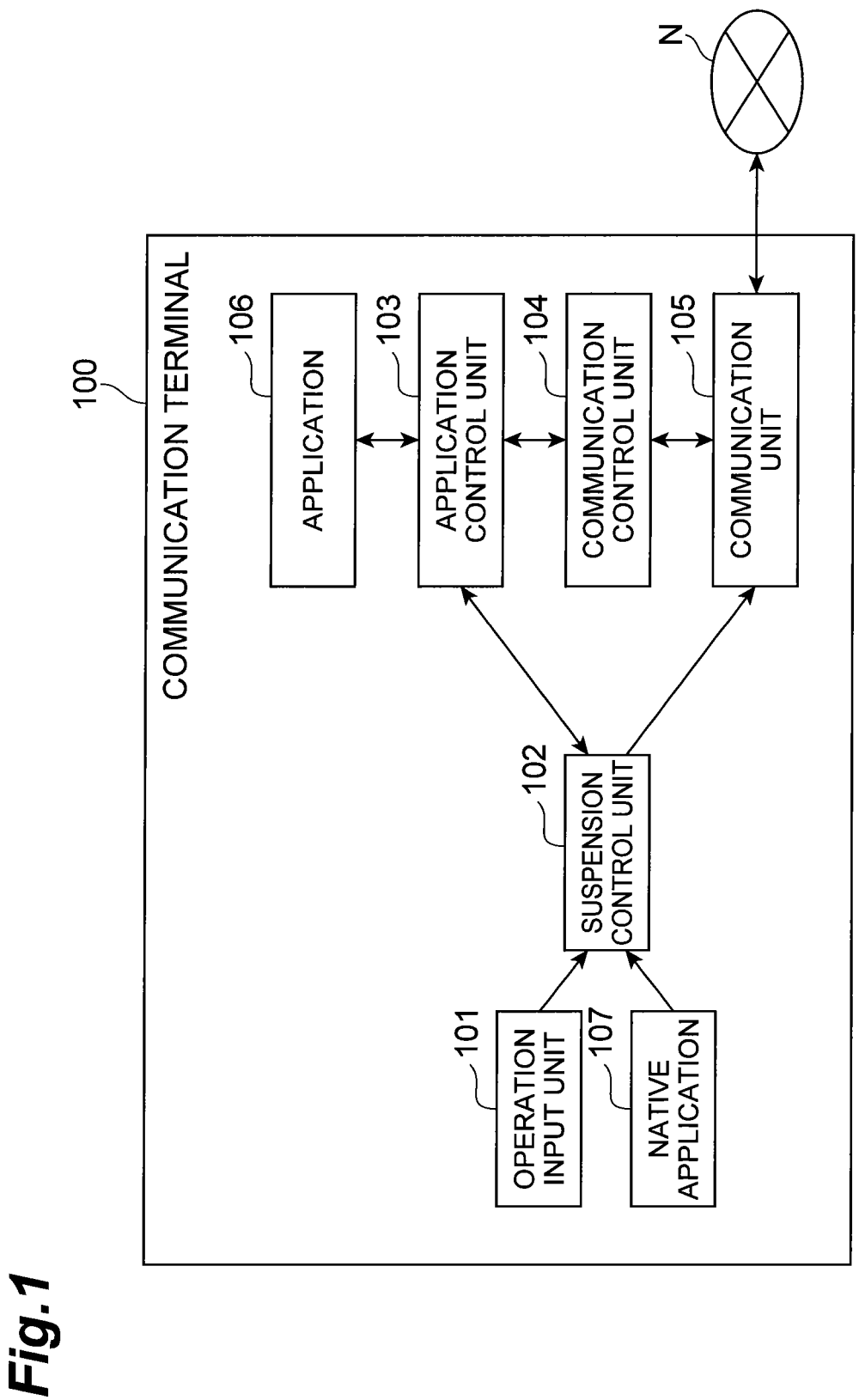
FIG. 1 is a functional block diagram of a communication terminal 100 according to one embodiment of the present invention.

FIG. 1 is a function block diagram of a communication terminal 100 according to one embodiment of the present invention. Examples of the communication terminal 100 include a cellular phone, a personal digital assistant (PDA), and other devices having a communication function. As depicted in FIG. 1, the communication terminal 100 is connected in a manner capable of mutual data communication with other communication terminals or a server not depicted via a communication network N configured with the Internet or other networks such as a mobile communication network or the WWW.

In addition, the communication terminal 100 can use various services by executing an application 106 in single or multiple numbers stored in the terminal. One of the services provided by the application 106 is an online game, for example, and in this case, a communication function, a saved-data storage function, an acquired-content (such as music or an item) storage function, and the like are included in the application 106. More specifically, these functions are implemented by an application program interface (API), for example.

Figure 2:
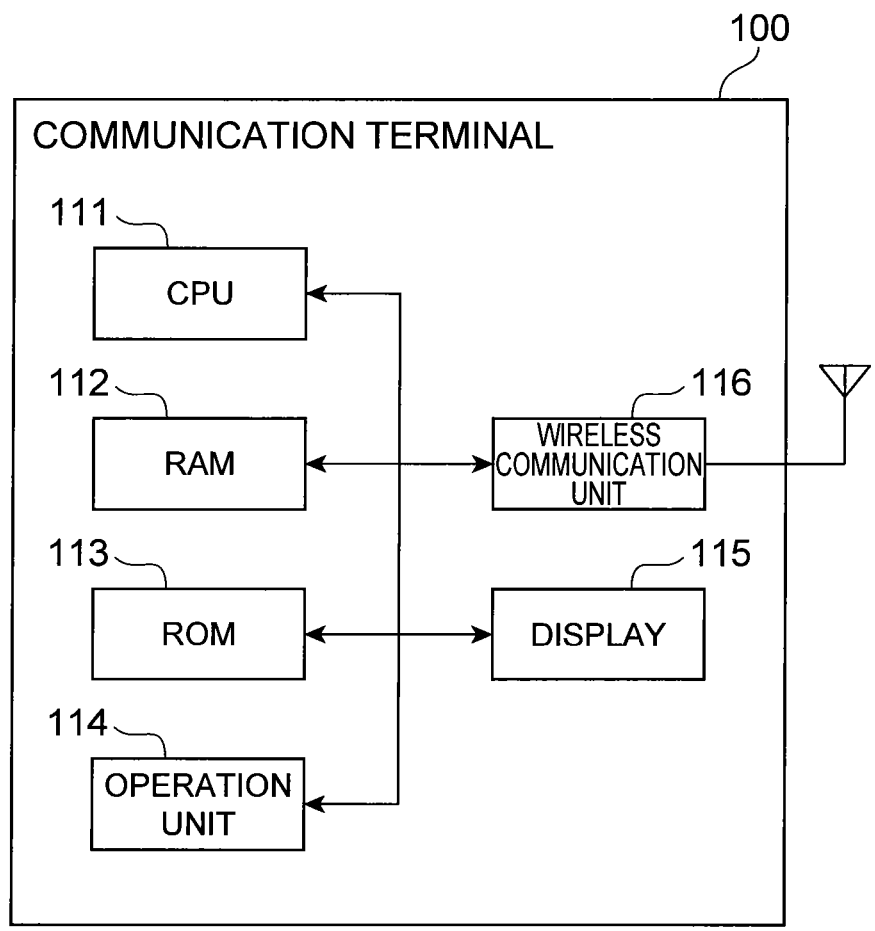
FIG. 2 is a hardware block diagram of the communication terminal 100.

FIG. 2 is a hardware block diagram of the communication terminal 100. The communication terminal 100 is physically configured as a terminal device having a central processing unit (CPU) 111, a random access memory (RAM) 112 and a read only memory (ROM) 113 being main memories, an operation unit 114 such as an input key being an input device, a display 115, a wireless communication unit 116, and the like. Each function of the communication terminal 100 depicted in FIG. 1 and described later is implemented by loading predetermined computer software into hardware such as the CPU 111 and the RAM 112 to operate the operation unit 114, the display 115, and the wireless communication unit 116 under control of the CPU 111, and also by reading and writing from and into the RAM 112 and the ROM 113.

Herein, in the present embodiment, a "native application" 107 means an application program in such a form that the CPU 111 of the terminal 100 can directly interpret and execute, and the "application" 106 means nonnative application programs such as a Java (trademark) application.

Referring back to FIG. 1, each of function blocks of the communication terminal 100 will described. The communication terminal 100 is configured to include an operation input unit 101, a suspension control unit (suspension control device) 102, an application control unit (application control device) 103, a communication control unit (communication control device) 104, and a communication unit (communication device) 105.

The operation input unit 101 receives input operation such as depression of a button or touch panel input by a user. More specifically, this is performed with the operation unit 114 out of a hardware configuration depicted in FIG. 2. The operation input unit 101, when detecting an input operation of a user, transmits this information to the suspension control unit 102.

The suspension control unit 102 controls suspension (stop)/resumption (restart) of the application 106 depending on an operation status of the communication terminal 100, and also when suspending a running application, determines whether to set communication connection with a network by the application into a keep-alive state or disconnect it. Herein, the "keep-alive" state means in the present embodiment a state in which communication (transmission and reception) is continued in a lower network IF layer when the application transitions to a suspended state. More specifically, this is performed by leaving a TCP session or UDP communication, for example, not disconnected.

In more detail, the suspension control unit 102, firstly when receiving information indicating that an input operation by a user of the communication terminal 100 is detected from the operation input unit 101, or when receiving a command (start of voice phone conversation, for example) from the native application 107, selects and determines how to handle the running application. More specifically, the suspension control unit 102 determines whether to suspend the running application or not and, depending on the suspended state, when the API of the communication function is executed, determines whether to maintain a connected state with a network by the communication unit or not, that is whether to select the keep-alive state or not.

Particularly in the present embodiment, while the application 106 communicating with the network N via the communication unit 105 is being executed by using the API of the communication function, the suspension control unit 102, when determining to suspend the application being executed, maintains a state of being connected with the network via the communication unit 105 by the communication function API that the application is using, and determines whether to select the keep-alive state or not.

To determine suspension and the keep-alive state, the suspension control unit 102, depending on terminal operations by the operation input unit 101 and the native application 107, defines in advance and stores therein how to handle the application (presence or absence of the suspension and the keep-alive state). FIG. 3 is a table illustrating one example of terminal operations that become factors of suspension and definition of whether to select the keep-alive state or not for each of these operations. As depicted in FIG. 3, when a terminal operation becoming a factor of suspension is reception of a voice call, call of a method (camera, digital television (DTV), etc.), transmission by a headset with a microphone, or hands-free communication, the application is suspended and also put in the keep-alive state, and, when a terminal operation becoming a factor of suspension is a low voltage alarm, reception of a video call (a trigger for answering the phone), multitasking when the application cannot be continued because of the terminal performance, or starting up to provide positional information, the application is suspended and communication connection with the network N is disconnected.

The suspension control unit 102, when determining to suspend the application, transmits a suspend command to the application control unit and, when determining not to select the keep-alive state in a case that a keep-alive definition associated with a suspension-causing operation depicted in FIG. 3 is "DISCONNECT", transmits a disconnect command to disconnect the communication connection with the network to the communication unit 105. In addition, the suspension control unit 102 starts continuing a supervisory timer for non-communication before the suspension and, also when the supervisory timer period expires, transmits a disconnection command to the communication unit 105. Meanwhile the suspension control unit 102, when determining to select the keep-alive state in a case that the keep-alive definition associated with the suspension-causing operation depicted in FIG. 3 is "KEEP ALIVE", does not transmit a disconnection command to the communication unit 105 to maintain the communication connection with the network by the communication unit 105 without disconnecting it.

The suspension control unit 102 secondly determines whether to resume the suspended application or not. In more detail, the suspension control unit 102, when an operation becoming a suspension factor ends, transmits a resume command to resume the suspended application to the application control unit.

The application control unit 103 controls starting up, execution, closing, suspension, and resumption of the application 106 stored in the terminal 100. In more detail, the application control unit 103 suspends or resumes the application 106 after receiving a suspend/resume command from the suspension control unit 102.

When suspending the application 106, the application control unit 103 transmits a "suspend notification" indicating that the application 106 has been suspended to the communication control unit 104.

When resuming the application 106, the application control unit 103 transmits a "resume notification" indicating that the application 106 has been resumed to the communication control unit 104, and also transmits a notification indicating that a resume process of the application 106 has been completed to the suspension control unit 102. In response to transmitting the resume notification to the communication control unit 104, the application control unit 103, when receiving data such as a response to a request from the network N while the communication terminal 100 is being suspended (in the keep-alive state), receives this data from the communication control unit 104 and passes it to the application 106. In more detail, the application control unit 103 continues an API for a communication function that was called at the time of suspension (hereinafter, referred to as "communication API"), and returns the received data to this communication API.

In addition, in response to transmitting the resume notification to the communication control unit 104, when the communication connection with the network N is disconnected during the suspension (in the keep-alive state), the application control unit 103 receives a "disconnection notification" indicating that the communication connection with the network N was disconnected from the communication unit 105, described later, via the communication control unit 104, passes it to the application 106, and presents it to the user of the terminal 100 via the application 106. Herein, examples of factors causing the communication connection with the network N to be disconnected include occurrence of some kind of error on the side of the network N, expiration of a period of a non-communication-state supervisory timer (for detecting a predetermined period of time passage in a non-communication state), and a disconnect command by the suspension control unit 102.

The application control unit 103 is implemented by Java (trademark) Virtual Machine (Java (trademark) VM).

The communication control unit 104 controls data communication connection with the network N by the control unit 105. In more detail, the communication control unit 104, when receiving the suspend notification from the application control unit 103 and not receiving the disconnection notification from the communication unit 105, determines that the application to be suspended will be in the keep-alive state, and continues the communication session by the communication unit 105. During the keep-alive state, when data such as a response that the communication unit 105 received is passed from the communication unit 105, the communication control unit 104 retains the data. The retained data is transmitted to the application control unit 103 in response to receiving the resume notification from the application control unit 103.

In addition, the communication control unit 104, during the keep-alive state, when disconnecting the network connection by the communication unit 105 with the expiration of the period of the non-communication-state supervisory timer in the terminal 100, or when receiving from the communication unit 105 the "disconnection notification" indicating that the communication unit 105 has disconnected the connection with the network, retains this disconnection notification and, in response to receiving the resume notification from the application control unit 103, transmits the disconnection notification to the application control unit 103.

In addition, the communication control unit 104, when the application 106 is newly started up by the application control unit 103 and this application 106 uses the communication API, transmits a command to connect communication with the network N (connect command) to the communication unit 105.

The communication control unit 104 is implemented by Java (trademark) Virtual Machine (Java (trademark) VM).

The communication unit 105 performs data communication with network N. More specifically, the communication unit 105 is implemented in hardware as the wireless communication unit 116 depicted in FIG. 2.

In more detail, the communication unit 105 establishes/disconnects connection with the network N in response to a control command (connect command or disconnect command) from the communication control unit 104. In addition, the communication unit 105 disconnects the communication connection with the network N in response to the disconnection command from the suspension control unit 102.

In addition, the communication unit 105, when receiving data such as a response from the network N, transmits the data to the communication control unit 104.

In addition, the communication unit 105, when the communication terminal 100 moves out of a service area during the communication connection with the network N, selects a preservation state. The "preservation" means continuing the connected state as an internal state for preserving an IP address, for example, when radio waves are lost and the communication terminal 100 is in an out-of-service state. Note that details of the preservation are defined by 3GPP.

In addition, the communication unit 105, when the connection with the network N is disconnected by occurrence of some kind of error on the side of the network N, expiration of a period of the non-communication-state supervisory timer in the terminal, and reception of a disconnect command from the suspension control unit 102 and the communication control unit 104, for example, transmits a disconnection notification to the communication control unit 104. However, when the network connection is disconnected after receiving a response for a transmitted request, a series of communication sessions for the request have already been completed, the communication unit 105 does not transmit the disconnection notification to the communication control unit. The communication unit 105, when receiving a command to transmit data such as a request from the application 106 in order that the application 106 newly calls the communication API to communicate with the network, transmits the disconnection notification to the communication control unit 104.

With reference to FIGS. 4 to 8, processes performed in the communication terminal 100 of the present embodiment will be described, and an application control method according to the present embodiment will be also described.

Figure 4:
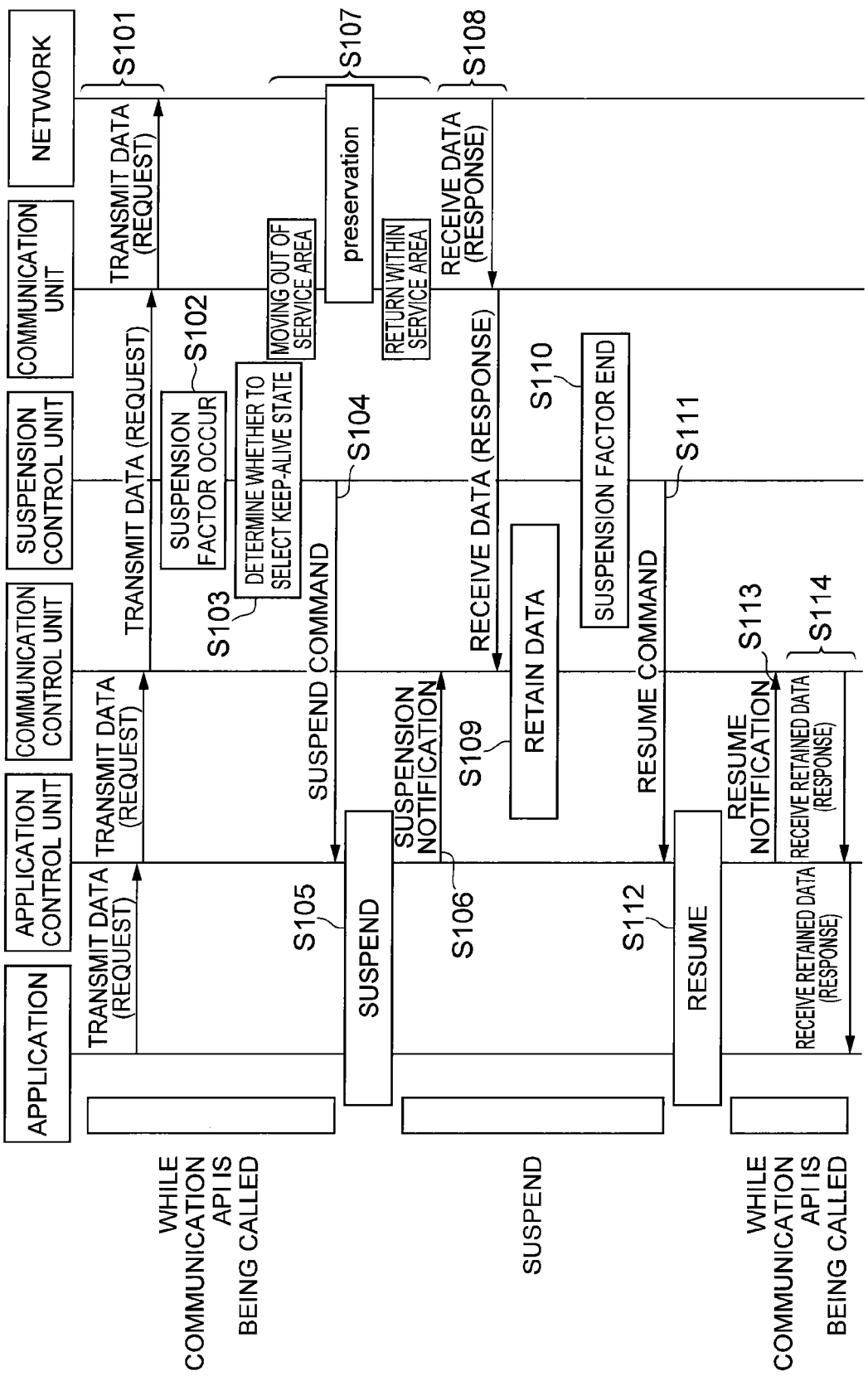
FIG. 4 is a sequence diagram illustrating a series of processes from suspension to resumption of an application that are performed in the communication terminal 100 of the present embodiment.

FIG. 4 is a sequence diagram illustrating a series of processes from suspension to resumption of an application that are performed in the communication terminal 100 of the present embodiment.

To begin with, by the communication API that is called in the application 106 running, data such as a request is transmitted to the network N via the application control unit 103, the communication control unit 104, and the communication unit 105 (S101).

Next, by the suspension control unit 102, based on terminal operations detected by the operation input unit 101 or the native application 107, whether an operation becoming a suspension factor has occurred or not (S102: detection step). One example of terminal operations that become suspension factors is as depicted in FIG. 3.

When it is determined that an operation becoming a suspension factor has occurred, by the suspension control unit 102, the application 106 is suspended in response to the terminal operation, and whether to select the keep-alive state or not is also determined (S103: selecting step). For example, the suspension control unit 102 defines in advance whether to select the keep-alive state or disconnect the network connection for each of the terminal operations becoming suspension factors, and performs determination based on this definition.

Then, by the suspension control unit 102, when it is determined that an operation becoming a suspension factor has occurred and this operation falls under operations for which a keep-alive state is defined to be selected, a suspend command to suspend the application 106 running is transmitted to the application control unit 103 (S104: transmitting step). Note that because FIGS. 4 to 8 illustrate cases in which the operation becoming a suspension factor falls under the keep-alive target, any command is not transmitted from the suspension control unit 102 to the communication unit 105 in these cases, but when the operation becoming a suspension factor does not fall under the keep-alive target and the network is configured to be disconnected for the operation, the suspend command is transmitted, and a disconnect command to disconnect the communication connection with the network is transmitted to the communication unit 105.

Next, by the application control unit 103, in response to the suspend command, the application 106 running is suspended (S105), and a suspension notification thereof is transmitted to the communication control unit 104 (S106). Through the processes at steps S102 to S106, at the time of transition of the application 106 to a suspended state, the keep-alive state is selected for continuing the communication connection with the network N.

Note that during the keep-alive state, when the communication terminal 100 moves out of a service area, by the communication unit 105, the preservation state is selected for continuing the connected state as an internal state for preserving an IP address, for example, and when the communication terminal 100 returns within the service area, the communication connection is resumed (S107).

During the keep-alive state, by the communication unit 105, when data such as a response for a transmitted request is received from the network N, the data thus received is transmitted to the communication control unit 104 (S108), and this data is retained by the communication control unit 104 (S109).

By the suspension control unit 102, when ending of the operation becoming a suspension factor is detected (S110), a resume notification for resuming the application suspended is transmitted to the application control unit 103 (S111).

By the application control unit 103, in response to the resume command, the application 106 suspended is resumed (S112), the communication API that was called at the time of suspension is called again, and the resume notification thereof is transmitted to the communication control unit 104 (S113).

Then, by the communication control unit 104, in response to the resume notification, the data received from the network N that was retained during the keep-alive status is passed to the communication API of the application 106 via the application control unit 103 (S114).

Figure 5:
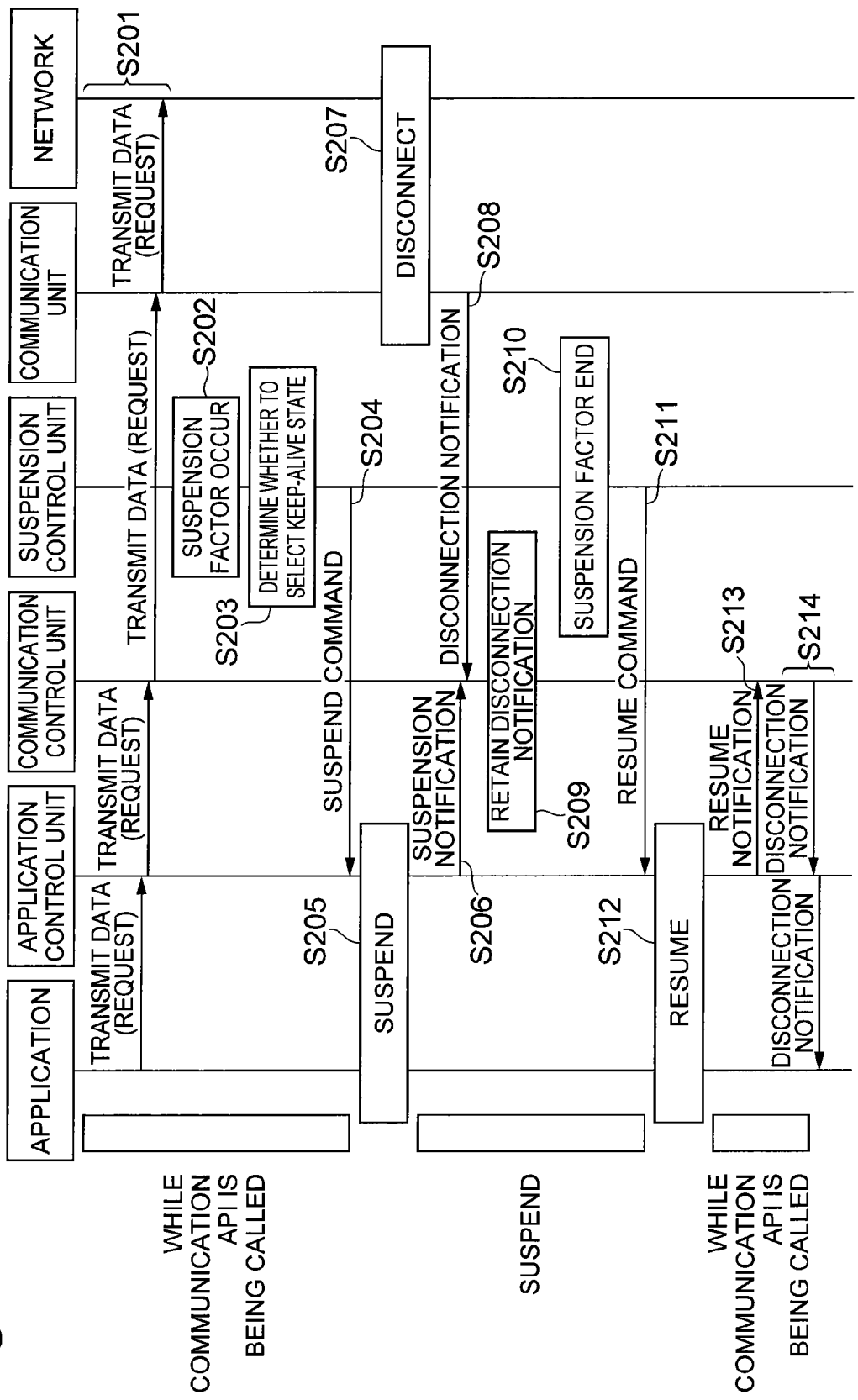
FIG. 5 is a sequence diagram illustrating processes when network connection is disconnected in the series of processes from suspension to resumption of the application that are performed in the communication terminal 100 of the present embodiment.

FIG. 5 is a sequence diagram illustrating processes when network connection is disconnected in the series of processes from suspension to resumption of the application that are performed in the communication terminal 100 of the present embodiment. Because steps S201 to S206 depicted in FIG. 5 are the same as steps S101 to S106 described referring to FIG. 4, explanations thereof will be omitted. In other words, through the processes at steps S201 to S206, at the time of transition of the application to a suspended state, the keep-alive state is selected for continuing the communication connection with the network N.

Then, during the keep-alive state, when the connection with the network is disconnected by occurrence of some kind of error on the network side, expiration of the period of the non-communication supervisory timer in the terminal, reception of a disconnect command from the suspension control unit 102 and the communication control unit 104, for example (S207), a disconnection notification is transmitted to the communication control unit 104 by the communication unit 105 (S208). Note that the communication unit 105, when transmitting a request at step S201, when information that a response for this request has not been received yet is stored and then the network connection is disconnected in this state, transmits a disconnection notification to the communication control unit 104.

The communication control unit 104 retains the disconnection notification received from the communication unit 105 during the keep-alive state (S209).

Next, through steps S210 to S213 (which are the same as steps S110 to S113 in FIG. 4, and thus explanations thereof will be omitted), the application 106 suspended is resumed, the communication API that was called at the time of suspension is called again, and the resume notification is transmitted to the communication control unit 104.

Then, by the communication control unit 104, in response to reception of the resume notification, the disconnection notification retained during the keep-alive state is passed to the communication API of the application 106 via the application control unit 103 (S214), and information indicating that the communication connection with the network N has been disconnected is presented to the user of the terminal 100 via the application 106.

Figure 6:
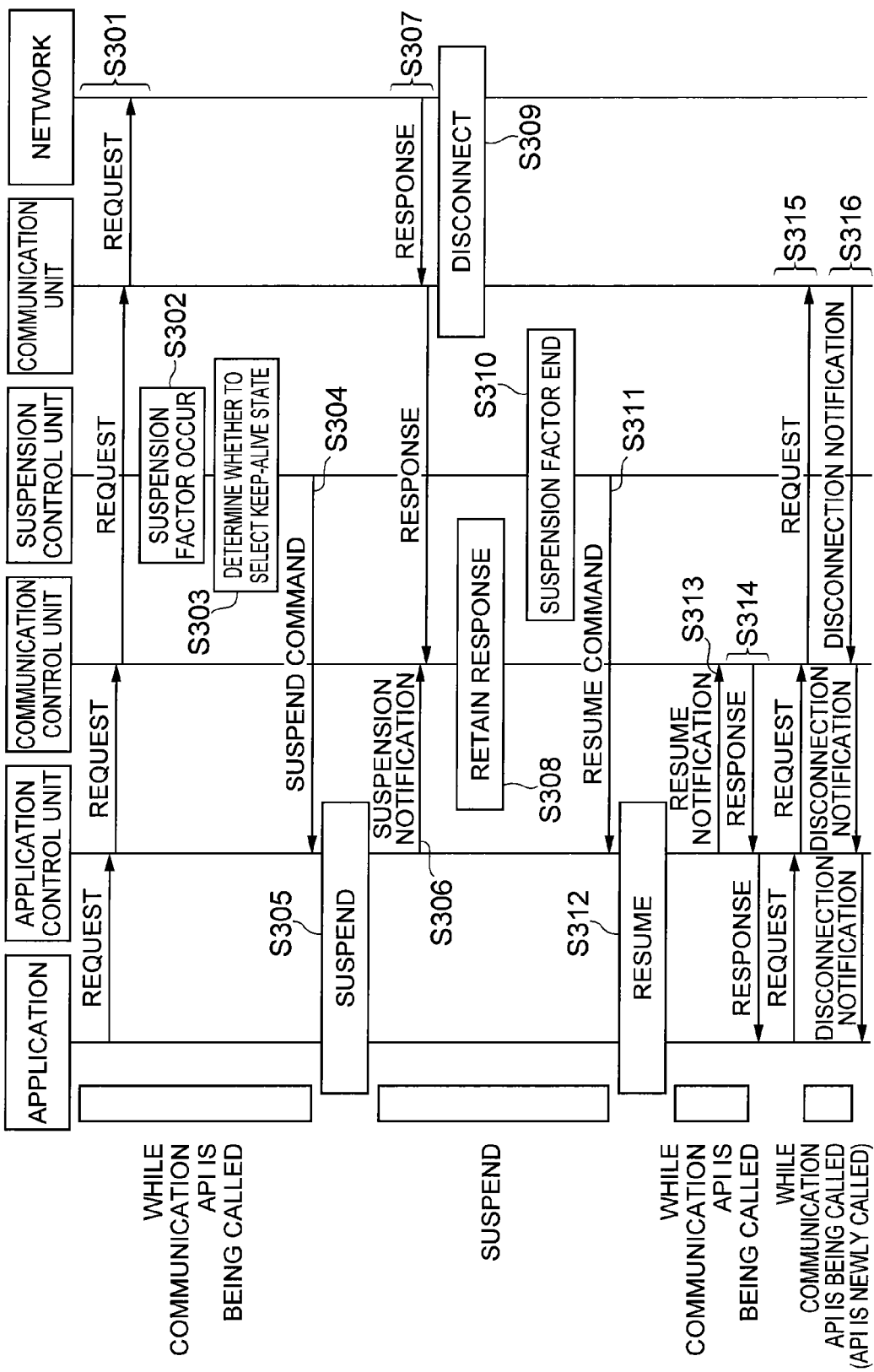
FIG. 6 is a sequence diagram illustrating processes when a network connection is disconnected after a response is received in response to a transmitted request in the series of processes from suspension to resumption of the application that are performed in the communication terminal 100 of the present embodiment.

FIG. 6 is a sequence diagram illustrating processes when the network connection is disconnected after a response is received in response to a transmitted request in the series of processes from suspension to resumption of the application that are performed in the communication terminal 100 of the present embodiment. Because steps S301 to S306 depicted in FIG. 6 are the same as steps S101 to S106 described referring to FIG. 4, explanations thereof will be omitted. In other words, through the processes at steps S301 to S306, at the time of transition of the application to a suspended state, the keep-alive state is selected for continuing the communication connection with the network N.

During the keep-alive state, by the communication unit 105, when the response for the transmitted request is received from the network, the response thus received is transmitted to the communication control unit 104 (S307), and the response is retained by the communication control unit 104 (S308). Note that at this time, the communication unit 105 stores therein information indicating that the response for the request transmitted at step S301 is received and the series of communication sessions have been completed.

Then, during the keep-alive state, when the connection with the network is disconnected (S309), the communication unit 105 retains the disconnection notification without transmitting it to the communication control unit 104 because the series of communication sessions for the request transmitted at step S301 have been completed as described above and the response has already been retained by the communication control unit 104.

Next, through steps S310 to S313 (which are the same as steps S110 to S113 in FIG. 4), the application suspended is resumed, the communication API that was called at the time of suspension is called again, and the resume notification is transmitted to the communication control unit 104.

Then, by communication control unit 104, in response to reception of the resume notification, the response received from the network N that was retained during the keep-alive state is passed to the communication API of the application 106 via the application control unit 103 (S314).

Furthermore, when the application 106 newly calls the communication API and transmits a command to transmit a request so as to communicate with the network N (S315), by the communication unit 105, a disconnection notification retained by the communication unit 105 at step S309 is passed to the communication API of the application 106 via the communication control unit 104 and the application control unit 103 (S316), and information indicating that the communication connection with the network has been disconnected is presented to the user of the terminal 100 via the application 106.

FIG. 7 is a sequence diagram illustrating processes when the application is suspended while the communication API is not being called and further communication connection with the network is disconnected during the keep-alive state in the series of processes from suspension to resumption of the application that are performed in the communication terminal 100 of the present embodiment.

The state of the application at the start of the sequence depicted in FIG. 7 is a state in which the communication API is not called, more specifically, it is a state in which an API without communication is called or a state in which an API is not called. In other words, the application does not perform data communication with the network. In such a state, through steps S401 to S405 (which are the same as steps S102 to S106 in FIG. 4), at the time of transition of the application to a suspended state, the keep-alive state is selected for continuing the communication connection with the network N. Then, the connection with the network is disconnected during the keep-alive state (S406). At this time, the application is in a state in which it does not perform data communication with the network, and accordingly the communication unit 105 retains the disconnection notification without transmitting it to the communication control unit 104.

Next, through steps S407 to S410 (which are the same as steps S110 to S113 in FIG. 4), the application 106 suspended is resumed, the state in which the API is called at the time of suspension is restored, and the resume notification is transmitted to the communication control unit 104. Herein, any data or notification is not retained at the communication control unit 104, and accordingly the application 106 is resumed without information being passed to the application 106.

Then, when the application 106 newly calls the communication API and transmits a command to transmit a request so as to communicate with the network N (S411), by the communication unit 105, the disconnection notification retained by the communication unit 105 at step S406 is passed to the communication API of the application 106 via the communication control unit 104 and the application control unit 103 (S412), and information indicating that the communication connection with the network has been disconnected is presented to the user of the terminal 100 via the application 106.

Operations performed in the communication terminal 100 according to the present embodiment described above are as follows.

(1) At the Time of Suspension
  When a TCP session and UDP communication, for example, exist at the time of suspension, they are not disconnected.
  Prevent the API that is being called at the time of suspension from failing.
(2) During a Keep-Alive State
  Continue communication (transmission and reception) in the lower network IF layer.
  Continue the non-communication supervisory timer before the time of suspension. Disconnect the communication at the time of expiration of a period of the supervisory timer.
(3) At the Time of Resume
(3-1) In a case that the connection is not disconnected during the keep-alive state
  Continue the communication session.
  Also continue the communication API that was called at the time of suspension.
  When the application is suspended while the API for receiving a response from the network is being called and the response is received from the network during the keep-alive state, return the response received to the API called at the time of resume.
(3-2) In a case that the communication is disconnected due to some kind of factor during the keep-alive state
  Keep the communication session disconnected.
  When the communication API is called at the time of suspension, exception for the disconnection occurs (transmit a disconnection notification).
  When the communication API is not called at the time of suspension (including both cases when an API is not called and when an API without communication is called), no exception for the disconnection occurs, and no particular notification is made. In this case, when the communication API is newly called after resume, a disconnection notification is transmitted.
  When the application is suspended while the API for receiving a response from the network is being called and the response is received from the network during the keep-alive state, return the response received to the API that was called at the time of resume.

Functions and effects by the communication terminal 100 and the application control method according to the present embodiment will be described hereinafter. With the communication terminal 100 and the application control method, the suspension control unit 102, when detecting a terminal operation that becomes a factor in suspending the application 106 that is running, transmits a suspend command to suspend the application 106 to the application control unit 103, and in response to the terminal operation detected, the keep-alive state for maintaining the communication connection with the communication network N by the communication unit 105 without disconnecting it can be selected.

Accordingly, while conducting online communication by the application 106, even when the application 106 is suspended by an erroneous depression of an on-hook key or a phone conversation for a short period of time, unintended and unnecessary disconnection of communication can be prevented from being performed and, when recovering the application 106 from the suspension, a time-consuming reconnection operation becomes unnecessary, and therefore convenience and comfortableness of a user can be improved. In addition, because communication with the communication network N by the communication unit 105 is maintained even if the application 106 is suspended, the communication seems to continue without any changes from a counterpart device that was communicating with the communication terminal 100 via the communication network N at the time of suspension, and smooth continuity of the communication with the counterpart device becomes possible.

In addition, the suspension control unit 102, when detecting an end of the terminal operation that becomes a factor in suspending the application 106, transmits a resume command to resume the application 106 in a suspended state to the application control unit 103, and the application control unit 103 resumes in response to reception of the resume command the application 106 that has been suspended in response to the suspend command.

In addition, the application control unit 103, when resuming the application 106 in response to the reception of the resume command, transmits a resume notification indicative of having resumed the application 106 to the communication control unit 104, and the communication control unit 104, with the communication API of the application 106 being executed when the application 106 is suspended, when receiving data on the communication API of the application from the communication network N via the communication unit 105 while the application 106 is being suspended, retains the data thus received and, in response to reception of the resume notification from the application control unit 103, transmits the data retained to the application control unit 103, and the application control unit 103 transmits the data received from the communication control unit 104 to the communication API of the application 106.

Accordingly, because data transmitted to the application 106 in a suspended state from an external communication network N can be received and retained, it becomes possible to acquire all data without exception even in a suspended state, which can further improve convenience and comfortableness of the user. In addition, because data transmission to the application 106 in a suspended state becomes possible, from the counterpart device that is communicating with the communication terminal 100 via the communication network N, the communication seems continuous without any changes, and smooth continuity of communication with the counterpart device becomes possible.

In addition, when the communication terminal 100 transitions to out of service while the application 106 is being suspended, the preservation state is selected for maintaining a connected state of communication with the communication network N by the communication unit 105, and accordingly disconnection of communication can be avoided even in transition to out of service for a short period of time such as passing through a tunnel, which can further improve convenience and comfortableness of the user.

In addition, the communication control unit 104, with the communication API of the application 106 being executed when the application 106 is suspended, when the communication with the communication network N by the communication unit 105 is disconnected while the application 106 is being suspended, retains a disconnection notification indicating that the communication has been disconnected and, when the application 106 suspended is resumed, transmits the disconnection notification to the communication API of the application 106 via the application control unit 103. Accordingly, when resuming the application that has been suspended while the communication function is being executed, it becomes possible to immediately notify the user of the communication terminal that the communication with the communication network was disconnected, which can further improve convenience and comfortableness of the user.

In addition, the communication control unit 104, when receiving data on the communication API of the application 106 from the communication network N via the communication unit 105 before the communication with the communication network N by the communication unit 105 is disconnected while the application 106 is being suspended, retains data thus received without retaining the disconnection notification and, when resuming the application 106 suspended, transmits the data to the application 106 via the application control unit 103.

Accordingly, before the communication with the external communication network N is disconnected, the data transmitted from the communication network N to the application 106 in a suspended state can be received and retained, and thus it becomes possible to acquire the data thus received even in a suspended state, which can further improve convenience and comfortableness of the user.

In addition, the communication unit 105, in a case that the communication API of the application 106 is not being executed when the application 106 is suspended and the communication with the communication network N by the communication unit 105 is disconnected while the application 106 is being suspended, retains information indicating that the communication has been disconnected and, when the communication API is executed after the application 106 suspended is resumed, transmits the disconnection notification indicating that the communication has been disconnected to the communication API of the application 106 via the communication control unit 104 and the application control unit 103.

Accordingly, even if the communication with the communication network N is disconnected during the suspended state, when the communication API of the application 106 is used for the first time after resume, it is possible to notify the user of the communication terminal 100 that the communication with the communication network N has been disconnected, and thus the user is not notified of unnecessary information when the application 106 is resumed, which can further improve convenience and comfortableness of the user.

The communication terminal 100 and the application control method according to the present invention have been described above by exemplifying preferred embodiments thereof, but the present invention is not limited to the above-described embodiments. As a variation in which communication connection with the network N by the communication unit 105 is disconnected, they may be configured to be disconnected the communication connection when detecting irregular communication (such as a state in which a user charged in usage-based rates is performing communication that exceeds a specific amount).

In addition, in the above-described embodiments, a request/response type of communication has been mainly exemplified in view of simplicity as an example in which keep-alive operation is performed, but other than this, even to communication in which the communication terminal 100 exclusively transmits or receives data, the present invention can be applied when a keep-alive operation is performed. Furthermore, when the communication terminal 100 becomes in the keep-alive state due to occurrence of a suspension factor during data transmission or reception, the present invention can be applied.

INDUSTRIAL APPLICABILITY

According to the present invention, it is possible to prevent unnecessary disconnection of communication by a suspend operation and to improve convenience and comfortableness of application operation.

REFERENCE SIGNS LIST

100 . . . communication terminal, 102 . . . suspension control unit (suspension control means), 103 . . . application control unit (application control means), 104 . . . communication control unit (communication control means), 105 . . . communication unit (communication means), 106 . . . application, N . . . communication network

The invention claimed is:

1. A communication terminal comprising:
circuitry configured to
control execution of an application;
control a communication device to establish communication with a communication network and execute a communication function of an application after the application including a communication function is executed;
suspend the application after detecting a terminal operation that becomes a factor in suspending the application without disconnecting a communication connection with the communication network by the communication device;
retain data corresponding to the application received from the communication network via the communication device while the application is suspended;
resume the application after detecting an end of the terminal operation that becomes a factor in suspending the application; and
provide the retained data to the application upon resuming the application.

2. The communication terminal according to claim 1, wherein the circuitry is configured to select a preservation state for maintaining communication connected with the communication network by the communication device when a state of the communication terminal transitions to out of service while the application is suspended.

3. The communication terminal according to claim 1, wherein the circuitry is configured to:
retain a disconnection notification indicating that communication has been disconnected when the communication with the communication network by the communication device is disconnected while the application is suspended; and
provide the disconnection notification to the communication function of the application when the suspended application is resumed.

4. The communication terminal according to claim 3, wherein the circuitry is configured to:
retain the data corresponding to the application received from the communication network without retaining the disconnection notification before the communication with the communication network by the communication device is disconnected while the application is suspended; and
provide the retained data to the application upon resuming the application.

5. The communication terminal according to claim 1, wherein the circuitry is configured to:
retain information indicating that communication has been disconnected in a case that the communication function of the application is not executed when the application is suspended and the communication with the communication network by the communication device is disconnected while the application is suspended; and
provide the disconnection notification to the application when the communication function is executed after the suspended application is resumed.

6. A method performed by an electronic device, the method comprising:
executing an application;
establishing, via a communication device of the electronic device, communication with a communication network and executing a communication function of an application after the application including a communication function is executed;
suspending the application after detecting a terminal operation that becomes a factor in suspending the application without disconnecting a communication connection with the communication network by the communication device;
retaining data corresponding to the application received from the communication network via the communication device while the application is suspended;
resuming the application after detecting an end of the terminal operation that becomes a factor in suspending the application; and
providing the retained data to the application upon resuming the application.

7. A non-transitory computer-readable medium including computer-program instructions, which when executed by an information processing device, cause the information processing device to:
execute an application;
establish, via a communication device of the electronic device, communication with a communication network and executing a communication function of an application after the application including a communication function is executed;
suspend the application after detecting a terminal operation that becomes a factor in suspending the application without disconnecting a communication connection with the communication network by the communication device;
retain data corresponding to the application received from the communication network via the communication device while the application is suspended;
resume the application after detecting an end of the terminal operation that becomes a factor in suspending the application; and
provide the retained data to the application upon resuming the application.

* * * * *

UNITED STATES PATENT AND TRADEMARK OFFICE
CERTIFICATE OF CORRECTION

PATENT NO. : 8,874,096 B2  
APPLICATION NO. : 13/641324  
DATED : October 28, 2014  
INVENTOR(S) : Ryo Nakajima Page 1 of 1

It is certified that error appears in the above-identified patent and that said Letters Patent is hereby corrected as shown below:

On the title page, Item (30), the Foreign Application Priority Data is incorrect. Item (30) should read:

-- (30)   Foreign Application Priority Data

Apr. 23, 2010   (JP) .............................P2010-100184 --

Signed and Sealed this  
Seventeenth Day of February, 2015

Michelle K. Lee  
*Deputy Director of the United States Patent and Trademark Office*